United States Patent
Fujikura et al.

(10) Patent No.: US 6,558,479 B2
(45) Date of Patent: May 6, 2003

(54) LOW IRON LOSS AND LOW NOISE GRAIN-ORIENTED ELECTRICAL STEEL SHEET AND A METHOD FOR PRODUCING THE SAME

(75) Inventors: Masahiro Fujikura, Futtsu (JP); Satoshi Arai, Himeji (JP); Masato Mizokami, Futtsu (JP); Hisashi Mogi, Futtsu (JP); Takeshi Kubota, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/854,266

(22) Filed: May 11, 2001

(65) Prior Publication Data

US 2002/0000261 A1 Jan. 3, 2002

(30) Foreign Application Priority Data

May 12, 2000 (JP) ........................ 2000-140395
Mar. 28, 2001 (JP) ........................ 2001-093616

(51) Int. Cl.$^7$ ................................. H01F 1/18
(52) U.S. Cl. ........................ 148/113; 148/111
(58) Field of Search ................. 148/110–113

(56) References Cited

U.S. PATENT DOCUMENTS

| | | | | |
|---|---|---|---|---|
| 5,478,410 A | * | 12/1995 | Ushigami et al. | 148/111 |
| 5,512,110 A | * | 4/1996 | Yoshitomi et al. | 148/111 |
| 5,782,998 A | * | 7/1998 | Ushigami et al. | 148/111 |
| 5,885,371 A | * | 3/1999 | Komatsubara et al. | 148/111 |
| RE36,423 E | * | 12/1999 | Komatsubara et al. | 148/113 |
| 6,136,456 A | * | 10/2000 | Komatsubara et al. | 148/100 |
| 6,309,473 B1 | * | 10/2001 | Hayakawa et al. | 148/111 |

FOREIGN PATENT DOCUMENTS

JP H8-269562 10/1996

* cited by examiner

*Primary Examiner*—John Sheehan
(74) *Attorney, Agent, or Firm*—Kenyon & Kenyon

(57) ABSTRACT

The object of the present invention is to provide a low iron loss and low noise grain-oriented electrical steel sheet for securing both low core loss and low noise of a transformer at the same time. The present invention relates to a grain-oriented electrical steel sheet containing Si: 1.0–4.0 wt % produced by controlling, with regard to $\epsilon_O$, which is defined as a 0-p value when a grain-oriented electrical steel sheet is magnetized up to a saturated magnetic flux density, and $\epsilon_{17}$, which is defined as the value obtained by subtracting a 0-p value at the magnetization magnetic flux density of 1.7 T from a 0-p value at a saturated magnetic flux density, $\epsilon_{OC}$ and $\epsilon_{17L}$, which are absolute values deviated by forming a tension film and a forsterite film, and $\epsilon_{OL}$ and $\epsilon_{17L}$, which are absolute values deviated by irradiating laser after the film formation, in adequate ranges respectively, and further controlling $\lambda_{17}$, which is a 0-p value at the magnetization magnetic flux density of 1.7 T, in the most appropriate range, when measuring a 0-p value of magnetostriction vibration in the rolling direction.

3 Claims, 2 Drawing Sheets

LOW IRON LOSS AND LOW NOISE GRAIN-ORIENTED ELECTRICAL STEEL SHEET AND A METHOD FOR PRODUCING THE SAME

BACKGROUND OF THE INVENTION

1. Field of the Invention

The present invention relates to a grain-oriented electrical steel sheet used for the iron core of a transformer, etc and, more specifically, to a low iron loss and low noise grain-oriented electrical steel sheet contributing to lowering not only the iron loss but also the noise of an iron core, and a method for producing the same.

2. Description of the Related Art

In recent years, it has been desired to reduce the noise and vibration of devices, in which electromagnetism is applied, such as transformers, and it has increasingly been required that a grain-oriented electrical steel sheet used for the iron core of a transformer is a material having not only low iron loss but also low noise and low vibration. It is said that magnetostriction of a grain-oriented electrical steel sheet is one of the causes for the noise and vibration of a transformer. Magnetostriction, as cited here, means the vibration generated in the rolling direction of the steel sheet when a grain-oriented electrical steel sheet is magnetized by alternating current, and the magnitude is as small as about $10^{-6}$. However, it has not been clarified what kinds of magnetostriction properties are effective for lowering the noise of a transformer.

The measure to lower noise has so far been to reduce magnetostriction. It is known that magnetostriction can be lowered by increasing the integration degree in the orientation of {110}<001> of secondary recrystallization grains. This is the same common measure as employed when iron loss reduction is required. As one of the proposals for materials in which magnetostriction is positively lowered, Japanese Unexamined Patent Publication No. H8-269562 is disclosed. In this publication, it is attempted to lower magnetostriction by intentionally leaving internal residual strains at annealing. However, by this method, hysteresis loss increases, causing an increase in iron loss, since the strains remain.

As mentioned above, the magnetostriction properties of a material for an iron core designed to lower the noise of a transformer have not clearly been proposed so far, and also those of a material to lower magnetostriction vibration have scarcely been proposed.

SUMMARY OF THE INVENTION

The object of the present invention is to provide a gran-oriented electrical steel sheet most suitable for securing both the low iron loss and the low noise of a transformer at the same time, namely, a grain-oriented electrical steel sheet containing Si: 1.0–4.0 wt % with low iron loss and low noise, and to provide a method for producing the same.

The present inventors, as a result of precisely investigating the relationship between the magnetostriction of a grain-oriented electrical steel sheet and the noise of a transformer and studying various material factors affecting the magnetostriction, have found out the fact that, as the factors of dominating magnetostriction, the tension of an insulation film and the imposition of fine strains by laser irradiation are very important in addition to the aforementioned integration degree in the orientation of {110}<001>, and have developed a steel sheet having low iron loss, and magnetostriction properties for lowering noise, by appropriately controlling those factors.

The gist of the present invention is as follows:

(1) A low iron loss and low noise grain-oriented electrical steel sheet, having:

$\epsilon_{OC}$, an absolute value deviated by forming a tension film from a standard value which is defined as $\epsilon_O$ in the state that a tension film substantially does not exist and laser is not irradiated, and $\epsilon_{OL}$, an absolute value deviated by irradiating laser after the film formation from the same standard value, satisfying the following expressions;

$$\epsilon_{OC} < 3.0 \times 10^{-6}$$

$$\epsilon_{OC} < 1.0 \times 10^{-6},$$

wherein $\epsilon_O$ is defined as a zero-peak value of magnetostriction vibration when a grain-oriented electrical steel sheet is magnetized up to a saturated magnetic flux density at the frequency of 50 Hz in the rolling direction; and $\epsilon_{17C}$, an absolute value deviated by forming a tension film from a standard value which is defined as $\epsilon_{17}$ in the state that a tension film substantially does not exist and laser is not irradiated, and $\epsilon_{17L}$, an absolute value deviated by irradiating laser after the film formation from the same standard value, satisfying the following expressions;

$$\epsilon_{17C} < 1.5 \times 10^{-6}$$

$$\epsilon_{17L} < 0.3 \times 10^{-6},$$

wherein $\epsilon_{17}$, is defined as the value obtained by subtracting a zero-peak value of magnetostriction vibration at the magnetization magnetic flux density of 1.7 T from a zero-peak value of magnetostriction vibration at a saturated magnetic flux density at the frequency of 50 Hz in the rolling direction; and further $\lambda_{17}$, a zero-peak value of magnetostriction vibration at the magnetization magnetic flux density of 1.7 T, satisfying the following expression;

$$-0.5 \times 10^{-6} \leq \lambda_{17} \leq 0.5 \times 10^{-6};$$

when magnetizing a grain-oriented electrical steel sheet at the frequency of 50 Hz in the rolling direction and measuring a zero-peak value (0-p value: the value of expansion or contraction at a certain magnetization magnetic flux density determined on the basis of the value in the state of demagnetization, which is positive in case of expansion and negative in case of contraction) of magnetostriction vibration in the rolling direction.

(2) A method for producing a low iron loss and low noise grain-oriented electrical steel sheet containing Si: 1.0–4.0 wt % comprising the step of determining a heat-input amount of laser irradiation to the unit of area of the steel sheet in accordance with a total amount of tension obtained by a primary film formed by a finish annealing and a secondary film formed by subsequent processes.

(3) A low iron loss and low noise grain-oriented electrical steel sheet according to the item (1), having: $\epsilon_{OC}$ and $\epsilon_{OL}$ satisfying the following expressions;

$$\epsilon_{OC} < 2.0 \times 10^{-6}$$

$$\epsilon_{OL} < 0.8 \times 10^{-6}; \text{ and}$$

$\epsilon_{17C}$ and $\epsilon_{17L}$ satisfying the following expressions;

$$\epsilon_{17C} < 1.0 \times 10^{-6}$$

$$\epsilon_{17L} < 0.3 \times 10^{-6}.$$

(4) A method for producing a low iron loss and low noise grain-oriented electrical steel sheet containing Si: 1.0–4.0 wt % comprising the step of; applying a total amount of tension of more than 1 MPa and less than 8 MPa which is obtained by a primary film formed by a finish annealing and a secondary film formed by subsequent processes, and irradiating laser beam in an amount of heat-input of 1–2 mJ/mm² to the specific unit of area of the steel sheet.

(5) A low iron loss and low noise grain-oriented electrical steel sheet according to the item (1), having $\epsilon_{OC}$ and $\epsilon_{OL}$ satisfying the following expressions;

$$1.0 \times 10^{-6} \leq \epsilon_{OC} < 3.0 \times 10^{-6}$$

$$0.5 \times 10^{-6} \leq \epsilon_{OL} < 1.0 \times 10^{-6},$$

and having $\epsilon_{17C}$ and $\epsilon_{17L}$ satisfying the following expressions;

$$0.5 \times 10^{-6} \leq \epsilon_{17C} < 1.5 \times 10^{-6}$$

$$\epsilon_{17L} < 0.3 \times 10^{-6}.$$

(6) A method for producing a low iron loss and low noise grain-oriented electrical steel sheet containing Si: 1.0–4.0 wt % comprising the step of; applying a total amount of tension of more than 14 MPa which is obtained by a primary film formed by a finish annealing and a secondary film formed by subsequent processes, and irradiating laser beam in an amount of heat-input of 1.5–3 mJ/mm² to the specific unit of area of the steel sheet.

DESCRIPTION OF THE PREFERRED EMBODIMENT

The present invention will hereunder be explained in detail.

A grain-oriented electrical steel sheet has three easy directions of magnetization, namely, [100], [010] and [001]. When a region magnetized in a direction different from the direction of a magnetic field is oriented in the direction of the magnetic field with the imposition of the magnetic field or a region oriented in the direction of a magnetic field is oriented in another easy direction of magnetization, expansion or contraction is generated, namely, magnetostriction is observed in the direction of the imposed magnetic field.

In an ideal grain-oriented electrical steel sheet having the grains completely arranged in the orientation of {110}<001>, the magnetic domain structure is composed of the regions magnetized only in the rolling direction, namely, of only 180° magnetic domains. Therefore, magnetostriction does not occur during magnetization.

However, in practice, closure domains called lancet magnetic domains exist in the steel sheet to decrease the magnetostatic energy caused by the deviation of orientation. Further, closure domains exist in the regions where strains are introduced and at the edge portions of the steel sheet too. The closure domains have regions magnetized in the thickness direction therein, and magnetostriction changes to plus (expansion) when those regions decrease, while it changes to minus (contraction) when they increase.

Figure 1:
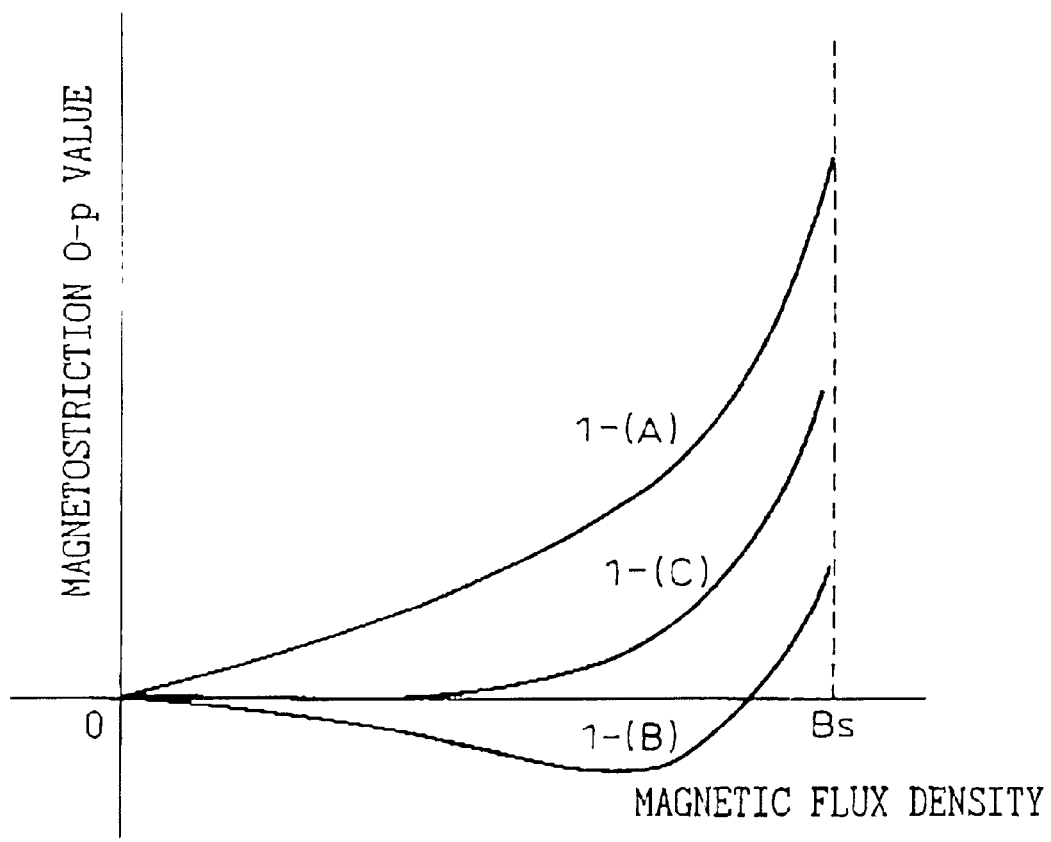
FIG. 1 is a graph showing the 0-p value of magnetostriction vibration varied by a magnetic flux density on the basis of the value in the state of demagnetization.

The magnetostriction 0-p value of a grain-oriented electrical steel sheet where a forsterite film or a tension insulation film is not formed and laser beam is not irradiated, as shown by the curve 1-(A) in FIG. 1, increases monotonously with the increase of the magnetization magnetic flux density. This is because the aforementioned lancet domains exist depending on the integration degree of orientation in the state of demagnetization and thus their volume is reduced with the application of magnetization.

When a tension insulation film is applied to a steel sheet, as shown by the curve 1-(B) in FIG. 1, the magnetostriction once decreases but turns to increase at a high magnetic flux density of about 1.7 T or higher. The reason is as follows;

Since the energy at the portions magnetized in the thickness direction increases by a magnetoelastic effect when tension is imposed on a steel sheet, the volume of lancet magnetic domains in the state of demagnetization decreases compared to the case that tension is not imposed. When a magnetic field is imposed on this, the displacement of 180° magnetic domain walls occurs and, since this increases the magnetostatic energy at the surface, lancet magnetic domains increase so as to decrease the magnetostatic energy. Therefore, the steel sheet contracts in this magnetic field. When the magnetic field is further intensified and the displacement of 180° magnetic domain walls terminates, magnetization proceeds while lancet magnetic domains are disappearing. In this case, the steel sheet expands.

In the aforementioned curves of 1-(A) and 1-(B), since the state of saturated magnetization is the same as the state that magnetized components in the directions other than the rolling direction disappear, the change of the magnetic domain structure can easily be studied by adopting this state as the basis of expansion and contraction.

Figure 2:
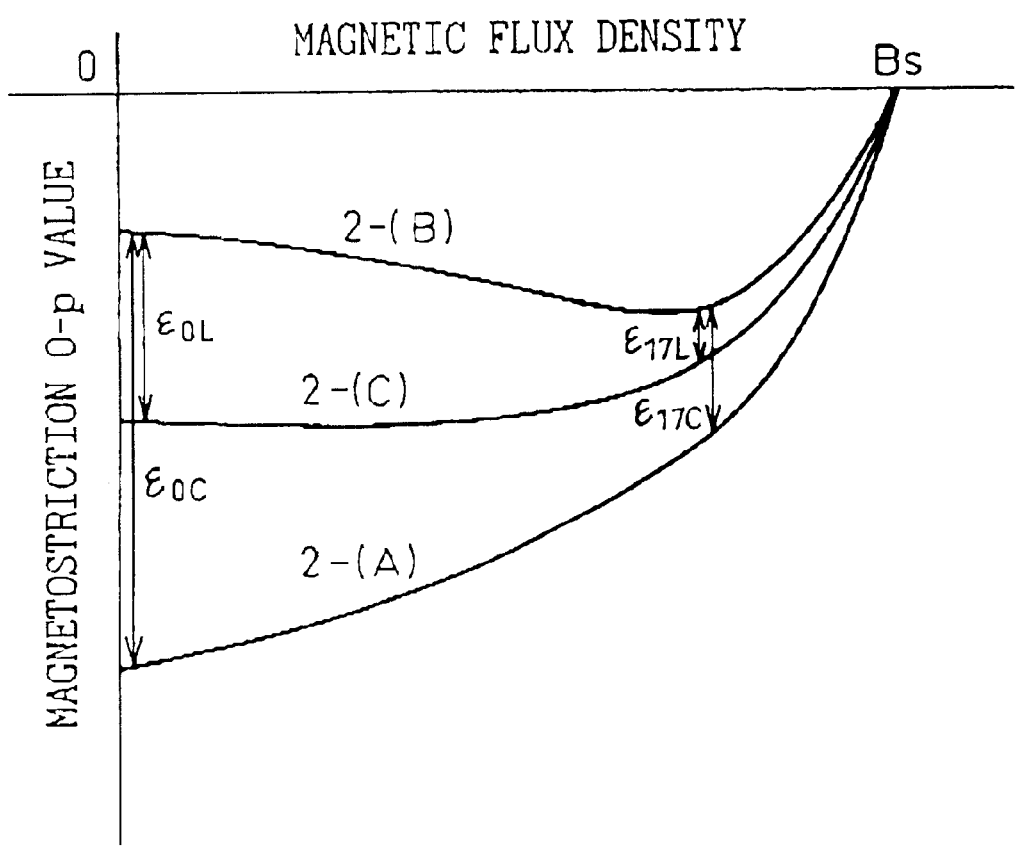
FIG. 2 is a graph showing the 0-p value of magnetostriction vibration varied by a magnetic flux density on the basis of the value in the state of a saturated magnetic flux density.

FIG. 2 shows the dependency of a magnetostriction 0-p value on a magnetic flux density setting the magnetostriction 0-p value at saturated magnetization to zero. In case of a steel sheet where a tension film is not applied, as shown by the curve 2-(A), the magnetostriction 0-p value decreases monotonously with the decrease of the magnetic flux density. On the other hand, in case of a steel sheet where a tension film is applied, as shown by the curve 2-(B), the magnetostriction 0-p value decreases once but increases after reaching the minimum value. In the state of demagnetization, the steel sheet of 2-(B) expands by the value of $\epsilon_{OC}$, as shown in the figure, compared to the steel sheet of 2-(A).

Further, with regard to the minimum value, the magnetic flux density where the 0-p value becomes the minimum depends on the degree of orientation of a steel sheet to the orientation of {110}<001>, and it has been found that the magnetic flux density where the 0-p value becomes the minimum is about 1.7 T in case of a conventional grain-oriented electrical steel sheet as a result of the investigation by the present inventors. Therefore, in the $\epsilon_{17}$ defined before, the steel sheet of 2-(B) expands by the value of $\epsilon_{17C}$ compared to the steel sheet of 2-(A) at the minimum value of 2-(B). The $\epsilon_{OC}$ and $\epsilon_{17C}$ valves can be freely controlled by changing the tension of an insulation film.

Further, the present inventors have found out that magnetostriction properties can be controlled freely by irradiating with a laser beam after a tension film is formed to the steel sheet. The effects will be explained hereunder.

When laser is irradiated to a steel sheet with a tension film shown by the curve 1-(B) in FIG. 1, the magnetostriction 0-p value varies as increasing monotonously. It is thought that this is because closure domains are formed as the laser irradiation introduces strains in the steel sheet and then the closure domains disappear with the application of magnetization.

The case where a saturated magnetization state is adopted as the basis is shown in FIG. 2. The curve 2-(C) which is the case of laser irradiation to a steel sheet with a tension film declines with the decrease of the magnetic flux density and, in the state of demagnetization, the steel sheet contracts by $\epsilon_{OL}$ as shown in the figure compared with the curve 2-(B). With regard to $\epsilon_{17}$ defined in relation to 1.7 T, the steel sheet contracts by $\epsilon_{17L}$. The $\epsilon_{OL}$ and $\epsilon_{17L}$ valves can be controlled freely by changing laser irradiation energy.

Moreover, the present inventors have earnestly studied how the magnetostriction properties of a grain-oriented electrical steel sheet should be set to reduce the noise of a transformer and the like and, as a result, have found that the most important feature is to control the predetermined value of $\lambda_{17}$ which is magnetstriction 0-p value on a magnetic flux density defined in relation to 1.7 T for reducing noise caused by the electric devices in addition to minimizing the amplitude by vibration. In other word, it is dispensable to control the value of $\lambda_{17}$ satisfying the following expressions;

$$-0.5 \times 10^{-6} \leq \lambda_{17} \leq 0.5 \times 10^{-6}.$$

when $\lambda_{17}$ is small, the higher harmonic wave components of magnetstriction vibration is increases. On the other hand, when $\lambda_{17}$ is large, magnetstriction vibration expands. These phenomenons are contribute to increase noise of a transformer. It has been also found out that, to obtain such a material, it is necessary to control film tension and laser irradiation energy adequately so that the aforementioned $\epsilon_{OC}$, $\epsilon_{OC}$, $\epsilon_{17C}$ and $\epsilon_{17L}$ are in the ranges below, $\epsilon_{OC} < 3.0 \times 10^{-6}$ $\epsilon_{OL} < 1.0 \times 10^{-6}$ $\epsilon_{17C} < 1.5 \times 10^{-6}$ $\epsilon_{17L} < 0.3 \times 10^{-6}$ and further $\lambda_{17}$, which is a 0-p value at the magnetization magnetic flux density of 1.7 T, satisfies the expression below, $$-0.5 \times 10^{-6} \leq \lambda_{17} \leq 0.5 \times 10^{-6}.$$

When film tension is decreased, $\epsilon_{OC}$ and $\epsilon_{17C}$ decrease. However, when film tension is excessively decreased, the deterioration of magnetostriction is intensified when stress is imposed on a steel sheet during transportation or assembly work of a transformer and then core loss deteriorates also. Therefore, it is preferable that the values of each of $\epsilon_{OC}$ and $\epsilon_{17C}$ is set at more than $0.1 \times 10^{-6}$. Further, since those values have upper limits depending on the integration degree of orientation, $\epsilon_{OC}$ and $\epsilon_{17C}$ are set at less than $3.0 \times 10^{-6}$ and less than $1.5 \times 10^{-6}$ respectively.

$\epsilon_{OL}$ and $\epsilon_{17L}$ become large as the laser irradiation energy intensifies. Therefore, $\epsilon_{OL}$ is set at more than $0.1 \times 10^{-6}$ and $\epsilon_{17L}$ at not less than 0. On the other hand, when the laser irradiation energy is excessively large, the amplitude of magnetostriction vibration becomes large and the noise when a steel sheet is assembled into a transformer becomes large. Therefore, $\epsilon_{OL}$ is set at less than $1.0 \times 10^{-6}$ and $\epsilon_{17L}$ at less than $0.3 \times 10^{-6}$.

Film tension can be controlled by adjusting the amount of a forsterite film formed after finishing annealing and the amount and component of an insulation film applied thereon. Laser irradiation can be applied by using a $CO_2$ laser or a YAG laser. From the viewpoint of core loss reduction, it is desirable that the region where strains are introduced by laser extends in a long and narrow shape to the direction perpendicular to the rolling direction of a steel sheet and the strain band is introduced cyclically in the rolling direction.

Further, it has been found that the desired magnetic properties are varied in accordance with the designed magnetic flux density. When the designed magnetic flux density is relatively small, a relatively weak film tension is rather effective for further smoothing the waveform of magnetostriction of a steel sheet, reducing the higher harmonic wave component of vibration and thus reducing the noise of a transformer. However, this means causes the deterioration of core loss. Low magnetostriction and low core loss have been successfully realized by irradiating a laser beam appropriately and applying magnetic domain control. The steel sheet is an electrical steel sheet having $\epsilon_{OC}$ and $\epsilon_{OL}$ controlled in the ranges of $\epsilon_{OC} < 2.0 \times 10^{-6}$ and $\epsilon_{OL} < 0.8 \times 10^{-6}$, respectively, and, $\epsilon_{17C}$, $\epsilon_{17L}$ and $\lambda_{17}$ in the ranges of $\epsilon_{17C} < 1.0 \times 10^{-6}$, $\epsilon_{17L} < 0.3 \times 10^{-6}$ and $-0.5 \times 10^{-6} \leq \lambda_{17} \leq 0.5 \times 10^{-6}$, respectively.

Further yet, the above mentioned electrical steel sheet can be produced by controlling a forsterite film and an insulation film whose total tension having more than 1 MPa and less than 8 MPa, and controlling a heat-input laser irradiating energy in an amount of 1–2 mJ/mm² to the specific unit of area of the steel sheet.

When the tension of an insulation film is small, the deterioration of magnetostriction increases when stress is imposed on a steel sheet during transportation or assembly work of a transformer and then iron loss deteriorates also. Therefore, the tension is set at not less than 1 MPa. On the other hand, when the tension is too strong, a higher harmonic wave component becomes to be included abundantly in the waveform of magnetostriction vibration and therefore the tension is set at less than 8 MPa.

On the other hand, when the designed magnetic flux density is large, it is necessary to strengthen tension to be applied to the steel sheet, and to control the degree of heat-input of the laser irradiation energy in an appropriate value in accordance with the applied film tension. As a result, the value of $\lambda_{17}$ can be set in the predetermined value. In addition, the magnetostriction vibration can be reduced in a small value in the ranges of from high magnetic flux density to low magnetic flux density. It is desirable to control the values of $\epsilon_{OC}$, $\epsilon_{OL}$, $\epsilon_{17C}$, $\epsilon_{17L}$ and $\lambda_{17}$ satisfying the following expressions;

$1.0 \times 10^{-6} \leq \epsilon_{OC} < 3.0 \times 10^{-6}$ $0.5 \times 10^{-6} \leq \epsilon_{OL} < 1.0 \times 10^{-6}$ $0.5 \times 10^{-6} \leq \epsilon_{17C} \leq 1.5 \times 10^{-6}$ $\epsilon_{17L} < 0.3 \times 10^{-6}$, and $-0.5 \times 10^{-6} \leq \lambda_{17} \leq 0.5 \times 10^{-6}$.

For realizing the above mentioned features, a production method is carried out by the steps of applying a total amount of tension of more than 14 MPa which is obtained by a primary film formed by a finish annealing and a secondary film formed by subsequent processes, and irradiating laser beam in an amount of heat-input of 1.5–3 mJ/mm² to the specific unit of area of the steel sheet.

EXAMPLE 1

In a grain-oriented electrical steel sheet containing Si: 1.0–4.0 wt % with the thickness of 0.23 mm processed up to finishing annealing by a conventional method, the thickness of a forsterite film and the coating amount of an insulation tension film were controlled and the film tension was varied. Further, a laser beam was irradiated on the steel sheet with the irradiation pitch of 5 mm in the rolling direction and the same of 0.03 mm in the transverse direction while varying pulsed energy. A YAG laser was used in this test. The irradiation energy is expressed by the energy introduced to a unit area of a steel sheet. A magnetostriction measuring device of the laser Doppler type was used for measuring magnetostriction and ten pieces, in each condition, were tested. Table 1 shows the conditions of preparing the test pieces and the results of the magnetostriction measurement on the average of the ten test pieces.

Further, three phase three legs (Limbs) stacked iron cores in the size of 750 mm×750 mm were fabricated using the steel sheets of each condition and the noise was measured. The width of the steel sheets was 150 mm and the number of stacked sheets was 180. In case of zero film tension, insulation films which do not generate tension were employed. The results are shown in Table 2. By using the steel sheets according to the present invention, transformers with low noise were obtained. The iron loss of iron cores is also shown in the table and it is shown that the present invention can provide good iron loss.

TABLE 2

|   | Transformer noise (dB (A)) f = 50 Hz, Bm = 1.7 T | Iron loss (W/kg) f = 50 Hz, Bm = 1.7 T |
|---|---|---|
| A | 42 | 0.97 |
| B | 43 | 0.98 |
| C | 41 | 0.98 |
| D | 43 | 0.99 |
| E | 41 | 1.01 |
| F | 40 | 0.95 |
| G | 49 | 1.03 |
| H | 48 | 1.05 |
| I | 50 | 1.10 |
| J | 55 | 1.30 |
| K | 54 | 1.60 |

A grain-oriented electrical steel sheet according to the present invention can be produced by adjusting film tension and irradiated laser energy so that $\epsilon_{OC}$, $\epsilon_{OL}$, $\epsilon_{17C}$, $\epsilon_{17L}$ and $\lambda_{17}$ are controlled in prescribed ranges respectively, and can secure both low core loss and low noise of a transformer at the same time.

What is claimed is:

1. A method for producing a low iron loss and low noise grain-oriented electrical steel sheet containing Si: 1.0–4.0 wt % comprising:

providing a primary film on said steel sheet, said primary film formed by finish annealing and then providing a secondary film on said primary film, said secondary film formed by processing subsequent to finish annealing;

determining a total amount of tension obtained from a combined total of tension resulting from said primary film and said secondary film;

determining a heat-input amount of laser irradiation for a unit area of said steel sheet in accordance with said

TABLE 1

|   | Film tension (MPa) | Laser energy (mJ/mm²) | $\epsilon_{0C}$ ($10^{-6}$) | $\epsilon_{0L}$ ($10^{-6}$) | $\epsilon_{17C}$ ($10^{-6}$) | $\epsilon_{17L}$ ($10^{-6}$) | $\lambda_{17}$ ($10^{-6}$) |   |
|---|---|---|---|---|---|---|---|---|
| A | 14 | 2 | 1.5 | 0.4 | 0.6 | 0 | −0.1 | Invention example |
| B | 8 | 2 | 1.5 | 0.4 | 0.6 | 0 | +0.2 | Invention example |
| C | 6 | 2 | 1.3 | 0.5 | 0.6 | 0.1 | +0.3 | Invention example |
| D | 6 | 1 | 1.4 | 0.2 | 0.6 | 0 | 0 | Invention example |
| E | 2 | 1 | 0.5 | 0.2 | 0.4 | 0 | +0.3 | Invention example |
| F | 16 | 2.5 | 2.0 | 0.8 | 0.8 | 0.2 | −0.2 | Invention example |
| G | 15 | 20 | 1.5 | 1.8 | 0.6 | 0.5 | +0.8 | Comparative example |
| H | 6 | 10 | 1.4 | 1.2 | 0.6 | 0.3 | +1.0 | Comparative example |
| I | 2 | 10 | 0.4 | 1.3 | 0.4 | 0.2 | +1.2 | Comparative example |
| J | 0 | 10 | 0 | 1.2 | 0 | 0 | +1.3 | Comparative example |
| K | 0 | 0 | 0 | 0 | 0 | 0 | +0.4 | Comparative example | determined total amount of tension and for controlling magnetostriction to reduce noise;

laser irradiating said steel sheet in accordance with said determined heat-input amount.

2. A method for producing a low iron loss and low noise grain-oriented electrical steel sheet containing Si: 1.0–4.0 wt % comprising:

applying a total amount of tension on said steel sheet in a range of more than 1 MPa and less than 8 MPa;

said total amount of tension obtained from a combined total tension resulting from a primary film formed by finish annealing and a secondary film on said primary film, said secondary film formed by processing subsequent to finish annealing;

irradiating said steel sheet having said applied total amount of tension with a laser beam having a heat-input of 1–2 mJ/mm$^2$ for a unit area of said steel sheet, said irradiating controlling magnetostriction to reduce noise.

3. A method for producing a low iron loss and low noise grain-oriented electrical steel sheet containing Si: 1.0–4.0 wt % comprising:

applying a total amount of tension on said steel sheet of more than 14 MPa;

said total amount of tension obtained from combined total tension resulting from a primary film formed by finish annealing and a secondary film on said primary film, said secondary film formed by processing subsequent finish annealing;

irradiating said steel sheet having said applied total amount of tension with a laser beam having a heat-input of 1.5 to 3 mJ/mm$^2$ for a unit area of said steel sheet, said irradiating controlling magnetostriction to reduce noise.

* * * * *